Aug. 19, 1969 H. C. BROWN 3,462,757
MEMORY AND CONVERSION CIRCUIT
Filed Nov. 12, 1964
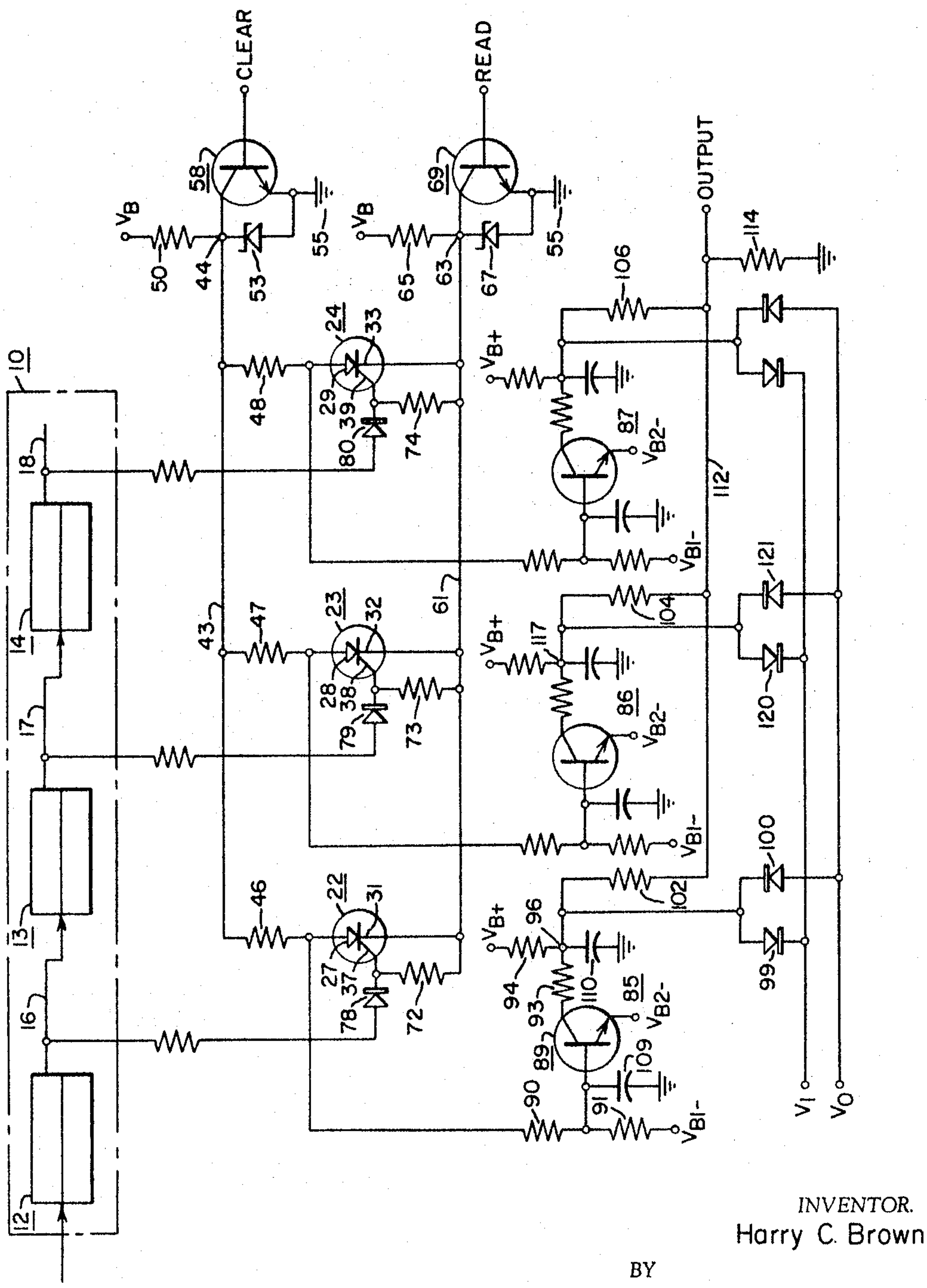
INVENTOR.
Harry C. Brown
BY
[signature]
ATTORNEY United States Patent Office 3,462,757

Patented Aug. 19, 1969

3,462,757
MEMORY AND CONVERSION CIRCUIT

Harry Curtis Brown, Glen Burnie, Md., assignor to Westinghouse Electric Corporation, Pittsburgh, Pa., a corporation of Pennsylvania Filed Nov. 12, 1964, Ser. No. 410,657
Int. Cl. H03k 13/02
U.S. Cl. 340—347 10 Claims

ABSTRACT OF THE DISCLOSURE

Each silicon controlled rectifier (SCR) of a plurality, receives at its gate electrode a signal from a respective stage of a counter. A clear circuit connected to the anodes of the SCR's initially places them into their non-conducting condition and a read circuit connected to the cathode and gate electrodes of the SCR's maintain them in their off condition even with an input signal being applied to the gate electrode. When a read pulse is provided to the read circuit it allows any input signal present to trigger its respective SCR to an on or conducting condition. The anode electrode of each SCR is connected to a respective current supply circuit having a certain valued resistor and first and second valued voltage supplies, and operable to supply a predetermined current in response to the condition of its associated SCR. Any currents provided are summed, which summation is an indication of the particular count in the counter.

This invention in general relates to memory and conversion circuits, and more in particular to circuitry for converting a plurality of input signals digitally representing a quantity into an analog signal representing that quantity.

In the information handling field there are a number of circuits, such as period counters and frequency counters, which will perform a counting function for recording the number of events occurring in a given time or recording the time between given events, and displaying this information in digital form. It often becomes necessary to utilize the count in the counter for such purposes as control, telemetering or graphical display where an analog information signal representing the count in the counter is utilized. Several methods of converting the digital signals in the counter to a useful analog output signal require the use of a set of bistable multivibrators identical to those in the main counter with a transfer network between the main counter and the set of multivibrators. These types of systems require the use of additional components which increase cost, size, weight and failure rate.

It is therefore an object of the present invention to provide an information transfer and conversion circuit utilizing a minimal number of components.

It is another object to provide an improved and simplified information transfer and conversion circuit.

Another object is to provide a circuit for converting digital output signals from an n-stage counter to an analog signal representing the value stored in the counter, which circuit will not adversely affect proper counter operation.

Another object is to provide an information transfer and conversion circuit which will provide an analog output signal representing a quantity digitally measured in a counter device, which analog signal will continually be provided until the circuit is placed into a reset condition.

Briefly, in accordance with the objects, the system constituting the invention includes a plurality of devices each operable in a first and second state of operation with each being responsive to an input signal from a digital signal providing device to switch between the states of operation when its respective input signal is above a certain value. A clear circuit is provided to initialize the devices all into the same state of operation and a read circuit is provided to effect the application of the input signals to each respective device.

A plurality of current providing circuits each provide a different valued current, with each circuit being responsive to the state of operation of the respective one of the devices so that when the device is in a chosen one of the states, the respective current supply circuit will supply its particular current to a summing means for providing an analog output signal.

The above stated as well as further objects and advantages of the present invention will become apparent upon reading the following detailed specification taken in conjunction with the single figure, illustrating an embodiment of the present invention.

In the figure there is shown a source of digital signals in the form of counter 10 which includes a plurality of stages, three being illustrated. The stages 12, 13 and 14 may be comprised of bistable multivibrator devices which will provide bivalued signals on leads 16, 17 and 18, the signals collectively being a digital representation of some quantity determined by the counter 10. The counter 10 may be a binary counter and consequently the signals appearing on leads 16, 17 and 18 will either be a one or a zero where a one for example represents some positive voltage and a zero, a less positive or ground potential. The one output signal on lead 16 from stage 12 would be an indication of the value $2^n$ wherein $n$ is 0; a one output signal on lead 17 from stage 13 is an indication of the presence of $2^1$; and a one signal on lead 18 from stage 14 is an indication of a value of $2^2$, as is well known to those skilled in the art.

A plurality of devices each operable in a first or second state of operation is provided, with each device being responsive to a respective input signal from the counter 10. Each of these devices 22, 23 and 24 includes a first electrode, or anode 27, 28 and 29, respectively and a second electrode or cathode 31, 32 and 33 respectively. Each of the devices 22, 23 and 24 is a controlled rectifier device such as a silicon controlled rectifier (SCR) and as such each includes a gate electrode 37, 38 and 39 respectively. Basically, in the absence of a positive signal at the gate electrode, an SCR will conduct little or no current therethrough. If the gate potential is brought to a positive potential, the SCR will switch to the on state of operation and will conduct, and will continue to conduct current therethrough even after the gate potential is removed. The SCR may be turned to its off state of operation once again by decreasing or reversing its anode potential. Although the embodiment of the invention illustrates SCR devices, other types of solid state devices operable in either a first or second state of operation finds use with the present invention. One such type of other device is the tunnel diode operable in a high and low voltage state of operation and which includes first and second electrodes to one of which may be applied an input signal to switch states of operation.

In order to initialize operation and place each of the SCR's 22, 23 and 24 into the same first state of operation, there is provided a clear circuit including a clear line 43 connecting each of the anodes 27, 28 and 29, through resistors 46, 47 and 48, to the junction 44 between resistor 50, connected to a source of biasing potential $V_B$, and a voltage reference device in the form of breakdown diode 53 having its anode electrode connected to a point of reference potential, ground 55. The breakdown diode 53 may be of the well known Zener type and so the voltage on line 43 is the reverse breakdown voltage of the Zener diode 53. Connected between the junction 44 and ground potential 55 is a transistor 58 essentially in parallel with the breakdown diode 53 and normally biased in an off condition. Upon an application of a clear pulse to the base of transistor 58, a switching action will occur and the turning on of transistor 58 will bring the potential at junction 44 to substantially ground potential (the collector-emitter voltage drop of transistor 58 when in the on condition is assumed to be negligible). The grounding of clear line 43 functions to depress the anode potentials of each of the SCR's 22, 23 and 24 to place them into their off or first state of operation.

In order to alter the potentials at the cathodes of the SCR's there is provided a second circuit means in the form of a read circuit which includes a read line 61 connecting each of the cathodes 31, 32 and 33 to junction 63 between resistor 65, connected to a source of bising potential $V_B$, and a second breakdown diode 67 which may also be of the Zener diode variety. Connected between junction 63 and a point of reference potential 55, is read transistor 69 which parallels the Zener diode 67. With the transistor 69 normally in an off condition, the voltage on read line 61 is identical to the breakdown voltage of the Zener diode 67, and when a read pulse is applied to the base of transistor 69 causing it to conduct, the voltage on line 61, connected to the collector of transistor 69, will assume substantially ground potential 55. The potential on read line 61 is additionally applied to gate electrodes 37, 38 and 39 through resistor 72, 73 and 74 respectively. The digital signals on lead 16, 17 and 18 of the counter 10 are applied to the gate electrodes of the SCR devices through diodes 78, 79 and 80 respectively. The operation of the circuit will be explained hereinafter, however, it should be pointed out that the breakdown voltage of Zener diode 67 and consequently the voltage on read line 61 is normally at a potential high enough to maintain the potential at the gate electrodes 37, 38 and 39 at a value insufficient to trigger its associated device into its on state of operation even with the presence of a positive "one" signal on any of the leads 16, 17 or 18.

A plurality of current supply circuits is provided for supplying different currents, the sum of which will be an indication of the quantity represented by the input signals. Three current supply circuits 85, 86 and 87 are illustrated. Each of the current supply circuits 85, 86 and 87 will supply its respective current in response to a certain state of operation of a respective SCR device 22, 23 or 24. Current supply circuit 85 includes a gating means in the form of transistor 89 having its input or base electrode connected to the anode 27 of SCR 22. The bias on the base of transistor 89 is determined by the voltage at the anode in conjunction with the voltage divider action of resistors 90 and 91 connected to a source of biasing potential $V_{B1-}$. The common or emitter electrode of transistor 89 is connected to a negative bias $V_{B2-}$ and the output or collector electrode is connected through resistors 93 and 94 to a suitable source of biasing potential $V_{B+}$.

In order to limit the voltage excursions when transistor 89 gates on and off, there is provided a clamping circuit including diode 99 having its anode electrode connected to point 96 and diode 100 having its cathode electrode connected to point 96 (connected to the output electrode of transistor 89 through resistor 93). The cathode electrode of diode 99 is connected to a source of positive potential $V_1$ and the anode of diode 100 is connected to a source of potential $V_0$ which, as an example, may have a value sufficient to make point 96 attain a zero potential when diode 100 conducts, and as such the value of $V_0$ will be equal to the voltage drop produced across diode 100. Resistor 102 is a weighted resistor having a value such that when a positive potential appears at point 96 a current will be produced having a value equal to, or proportional to, the value of a respective stage in the counter 10. By way of example, the three stage counter 10 has a stage 12 representative of a $2^0$ value, another stage 13 representative of a $2^1$ value and another stage 14 representative of a $2^2$ value. Resistor 102 therefore may have a value of the reciprocal of stage 12, that is resistor 102 will have a relative value of $1/2^0$. Resistor 104 of current supply circuit 86 in similar fashion may have a value of $1/2^1$ and resistor 106 of current supply circuit 86 will have a weighted value of $1/2^2$. Other than the values of resistors 104 and 106, current supply circuits 86 and 87 are identical to the described current supply circuit 85. Capacitor 109 may be inserted between the base of transistor 89 and ground potential to filter out any transient signals which may occur due to the switching action of SCR 22, and capacitor 110 may be inserted between point 96 and ground potential to filter out any transient signals which may occur and which may adversely affect operation when transistor 89 switches between its on and off conditions.

Any current supplied by the current supply circuits will flow through output line 112, and in order to sum the currents there is provided a summing means in the form of summing resistor 114, connected between an output junction and ground, the output voltage thereacross being equal to the sum of all the currents provided times the value of resistor 114.

To best describe the operation of the present invention, a situation will be illustrated wherein the count in counter 10 is to be converted to an analog signal and for purposes of illustration the signal on lead 16 will be a "one," on line 17 a "zero" and on line 18 a "one" representing the binary number 101 equivalent to decimal number 5. SCR 22 will therefore have a high voltage one signal applied to its gate, SCR 23 a low voltage zero signal and SCR 24 a high voltage one signal. At this time, transistor 69 of the read circuit is in its cutoff condition and the voltage at point 63 and read line 61 is at a value determined by the breakdown potential of Zener diode 67 which value is chosen to be somewhat higher than any one signal supplied by stages 12, 13 or 14. With these voltage conditions any one signal provided and appearing at the anodes of diodes 78, 79 or 80 will be prevented from triggering a respective SCR since the voltage at the cathodes of the same diodes will be at a somewhat higher potential than the anodes thereof. Since none of the diodes at this time can conduct, the voltage on line 61 not only is applied to each gate electrode but is similarly applied to each cathode electrode of the SCR's and consequently will prevent them from turning on, since the gate potential has to be relatively higher than the cathode potential in order to trigger an SCR.

At this time, the voltage on clear line 43 is at a potential determined by the breakdown voltage of Zener diode 53 and is chosen to have a higher breakdown value than the Zener diode 67. When it is desired to read the contents of the counter 10, the clear pulse is supplied to the base of transistor 58 bringing point 44 and clear line 43 down to substantially ground potential which has the effect of turning off any SCR which might have been on from a previous reading, and placing them all into their off, or first state of operation. Immediately after the clear pulse is removed, a read pulse is applied to transistor 69 thereby bringing point 63 and read line 61 down to ground potential. The grounding of read line 61 also places each of the cathodes of the SCR's at ground potential and decreases the voltage at each of the cathodes of diodes 78, 79 and 80 thereby allowing any high voltage input signal that is present on lines 16, 17 and 18 to be applied to a respective gate electrode 37, 38 or 39. In the example given, the signal on lead 16 is a high voltage "one" and is passed by diode 78 to trigger the SCR 22 to its on, or second state of operation. The signal on lead 17 was a "zero" and consequently of insufficient voltage to trigger the SCR 23 to its on state of operation. The signal on lead 18 was a high voltage "one" which is passed by the diode 80 to gate 39 effecting the switching of SCR 24 to its second state of operation. The discontinuance of the read pulse to the base of transistor 69 again causes the read line 61 to assume its higher potential determined by the breakdown voltage of Zener diode 67. This changing of voltage does not affect the on and off states of the SCR's which will remain in their respective states until a subsequent clear and read operation. Before the subsequent operations, a new pulse train may be introduced into counter 10 without affecting the information stored in the SCR's 22, 23 and 24.

With SCR 22 in an on state of operation, the voltage at the anode is equal to the voltage on line 61 plus a small voltage drop across the SCR 22. This voltage similarly exists at the anode 29 of SCR 24. Since SCR 23 is in its off state of operation, the voltage at the anode 28 thereof will be at the potential of the clear line 43, which potential is determined by the breakdown voltage of Zener diode 53. As was before stated, the breakdown voltage of Zener diode 53 is chosen to be greater than the breakdown voltage of Zener diode 67. This is to insure that when an SCR is in its conducting or on state of operation the anode thereof will be at a certain potential and when an SCR is in its off or first state of operation the anode thereof will be at a different and higher potential.

With SCR 22 in its on state of operation, the voltage appearing at the anode 27 in conjunction with the voltage divider action of resistors 90 and 91 maintain the base of transistor 89 at a potential insufficient to turn the transistor on. Since the off transistor is in effect an open switch, a current path is established from $V_{B+}$ through resistor 94 and through diode 99. The voltage at point 96 therefore will be the $V_1$ voltage plus the voltage drop across diode 99. The $V_1$ voltage is less than the $V_{B+}$ voltage and is chosen, taking into consideration the voltage drop across diode 99, such that the relative current, $2^0$ is provided. By way of example, if $V_1$ is chosen to be in the order of 9.5 volts, (with .5 being the approximate voltage drop across diode 99), the voltage appearing at point 96 will be in the order of 10 volts and with the resistor 102 having a relative value of $1/2^0$, the current provided will have a relative value of 10 $(I = E \div R)$. The positive voltage at point 96 insures that diode 100 remains in a non-conducting condition.

In a manner identical to that with respect to current supply circuit 85, current supply circuit 87 will provide a current having a relative value of 40 since the voltage applied to transistor 106 will be 10 and the value of resistor 106 is $1/2^2$.

The transistor of current supply circuit 86 is responsive to the SCR 23, and with the relatively higher voltage at the anode 28 thereof, the voltage divider action at the base of the transistor will be sufficient to turn the transistor on and the voltage at point 117 will assume some negative value as determined by the negative bias $V_{B2-}$ applied to the emitter of the transistor, and the collector-emitter voltage drop. With a negative voltage at point 117, diode 120 is non-conducting whereas diode 121 will conduct. With a $V_0$ clamp voltage equal to approximately the voltage drop of the diode 121, the voltage at point 117 may be made zero volts and consequently no current will be provided by the current supply circuit 86.

The 10 value current, the 0 value current, and the 40 value current provided by current supply circuits 85, 86 and 87 respectively, collectively flows through summing resistor 114 to provide an output voltage proportional to the current flowing therethrough. It is evident that various values of voltages and resistors may be chosen such that the combination of currents flowing will provide an output voltage of 5 or 50, or .5 or any other voltage proportional to the count in counter 10.

Having thus described the invention, many modifications thereof become apparent. It has been mentioned that other types of devices may be used with equal facility in place of the SCR's. In the current supply circuits a constant voltage value was utilized with weighted resistors. Obviously individual weighted voltage supplies could be used with weighted or equal valued resistors 102, 104 or 106. It should be understood that the present disclosure has been made by way of example and that other modifications and variations of the present invention are made possible in the light of the above teachings.

What is claimed is:

1. A circuit for converting a plurality of input signals digitally representing a quantity into an analog signal representing that quantity, comprising:

a plurality of devices each operable in a first and second state of operation;

circuit means coupled to said devices for initially placing all of said devices into the same state of operation independently of said input signals;

read means operable immediately after said circuit means for allowing a respective one of said input signals to be applied to a respective one of said devices for switching the device to its opposite state only if said signal is above a certain value;

a plurality of current supply circuits each for supplying a different value current and each being coupled to, and responsive to the state of operation of, of a corresponding one of said devices for supplying said current when the respective device is in a predetermined one of said states;

means for summing the currents supplied by said current supply circuits; and means coupling said plurality of current supply circuits to said means for summing.

2. A circuit for converting a plurality of input signals digitally representing a quantity into an analog signal representing that quantity, comprising:

a plurality of devices each including a first and second terminal, and operable in a first and second state of operation;

a clear circuit connected to the first terminal of all said devices for placing each said device into said first state of operation in response to a clear signal applied to said clear circuit;

means connecting a respective device with a respective one of said input signals;

a read circuit connected to the second terminal of all said devices for altering the potential thereat in response to a read signal applied to said read circuit;

the altering of potential at said second terminal allowing a respective input signal to switch the device to which it is applied to its second state of operation if the input signal is above a certain value;

a plurality of current supply circiuts each for supplying a different valued current and each being coupled to, and responsive to the state of operation of, a corresponding one of said devices for supplying said current when its respective device is in a predetermined one of said states;

means for summing the currents supplied by said current supply circuits; and means coupling said plurality of current supply circuits to said means for summing.

3. A circuit for converting a plurality of input signals digitally representing a quantity into an analog signal representing that quantity, comprising:

a plurality of devices each operable in a first and second state of operation;

means coupled to said devices for placing each said device into said first state of operation;

means for applying a respective one of said input signals to a respective one of said devices to switch the device to its second state of operation if its respective signal has a first value;

said device remaining in said first state of operation if its received signal has a second value;

a first and second voltage source;

a plurality of current supply circuits each including a respective resistor;

each said current supply circuit additionally including a gate means coupled to, and responsive to the state of operation of, a respective one of said devices for connecting said first voltage source with its respective resistor if said device is in one of said states of operation and to connect said second voltage source with its respective resistor if said device is in the other of said states;

each said current supply circuit providing a predetermined current when said first voltage source is connected to its respective resistor;

means for summing the currents supplied by said current supply circuits; and means coupling said plurality of current supply circuits to said means for summing.

4. A circuit for converting the digital output signals from a multi-stage counter to an analog signal representing the value stored in the counter, comprising:

a plurality of devices each operable in a first and second state of operation;

means coupled to said devices for placing each said device into said first state of operation;

circuit means for applying the output signal from each stage of said counter to a respective one of said devices to switch the device to its second state of operation only if the received output signal has a predetermined first value;

a plurality of transistors each including an input, output and common electrode;

the input electrode of each said transistor being connected to a respective one of said devices;

a plurality of first diodes each having their anode electrode connected to the output electrode of a respective one of said transistors and their cathode electrode connected to a first reference potential;

a plurality of second diodes each having their cathode electrode connected to the output electrode of a respective one of said transistors and their anode electrode connected to a second reference potential;

an output junction;

a plurality of resistors each having one terminal connected to the output electrode of a respective one of said transistors, and a second terminal connected to said output junction; and a summing resistor connected between said output junction and a point of common reference potential.

5. A circuit for converting a plurality of input signals digitally representing a quantity, into an analog signal representing that quantity, comprising:

a plurality of devices each including a first and second terminal and operable in a first and second state of operation;

first circuit means coupled to said devices for establishing all said first terminals at a first potential and including, a first resistor connected to a source of biasing potential, a first breakdown diode having one electrode connected to said first resistor and another electrode connected to a point of reference potential, a clear line connecting all said first terminals to the junction between said first resistor and breakdown diode, a first normally open switch for establishing a parallel path from said junction to said point of reference potential, to place said clear line at substantially said point of reference potential when said first switch is closed;

second circuit means coupled to said devices for establishing all said second terminals at a second potential and including, a second resistor connected to a source of biasing potential, a second breakdown diode having one electrode connected to said second resistor and another electrode connected to a point of reference potential, a read line connecting all said second terminals to the junction between said second resistor and second breakdown diode;

a second normally open switch for establishing a parallel path from said junction to said point of reference potential, to place said read line at substantially said point of reference potential when said second switch is closed;

means operable after said second switch has closed to connect a respective device with a respective one of said input signals for placing said device into one of said states of operation in response to the value of the input signal;

a plurality of current supply circuits each being coupled to, and responsive to the state of operation of, a respective one of said devices for supplying a predetermined value of current if its respective device is in a predetermined one of said states of operation;

means for summing the currents supplied by said current supply circuits; and means coupling said plurality of current supply circuits to said means for summing.

6. A circuit according to claim 5 wherein the first and second normally open switches comprise transistors normally biased in the non-conducting state.

7. A circuit according to claim 5 wherein the first and second breakdown diodes are Zener diodes.

8. A circuit according to claim 7 wherein the Zener diodes have different breakdown voltages.

9. A circuit for converting a plurality of input signals digitally representing a quantity, into an analog signal representing that quantity, comprising:

a plurality of controlled rectifiers each having an anode, cathode and gate electrode;

means coupled to said controlled rectifiers for placing said controlled rectifiers into their non-conducting condition independently of said input signals;

means for supplying a respective one of said input signals to a respective one of said gate electrodes to place the controlled rectifier into its conducting condition if the input signal received is above a certain value;

a plurality of current supply circuits each being coupled to, and responsive to the condition of, a respective controlled rectifier for providing a predetermined current;

means for summing the currents provided by said current supply circuits; and means coupling said plurality of current supply circuits to said means for summing.

10. A circuit for converting the digital output signals from a multi-stage counter to an analog signal representing the value stored in the counter, comprising:

a plurality of controlled rectifiers each having an anode, cathode and gate electrode;

means coupled to said controlled rectifiers for establishing a reference potential at each of said anodes when said controlled rectifiers are in a non-conducting state;

means coupled to said controlled rectifiers for applying a second reference potential to both said gate and cathode electrodes of each said controlled rectifier;

a diode connecting the output signal from each stage of said counter to a respective one of said gate electrodes;

means for altering the potential at the gate electrodes of said controlled rectifiers for allowing a respective one of said output signals to trigger a respective one of said controlled rectifiers to an on condition if the output signal is above a predetermined value;

a plurality of current supply circuits each being coupled to, and responsive to the voltage at, the anode electrode of a respective one of said controlled rectifiers for providing a predetermined current;

means for summing the current provided by said current supply circuits; and means coupling said plurality of current supply circuits to said means for summing.

References Cited

UNITED STATES PATENTS

| | | | |
|---|---|---|---|
| 3,223,994 | 12/1965 | Cates | 340—347 |
| 3,225,345 | 12/1965 | Absatz et al. | 340—347 |
| 3,225,346 | 12/1965 | Buddenaagen | 340—347 |
| 3,247,397 | 4/1966 | Kopek et al. | 340—347 |
| 3,299,315 | 1/1967 | McMillan | 340—347 |
| 3,305,857 | 2/1967 | Barber | 340—347 |
| 3,307,173 | 2/1967 | Popodi et al. | 340—347 |

MAYNARD R. WILBUR, Primary Examiner.

W. J. KOPACZ, Assistant Examiner.